Sept. 30, 1969   M. D. SPITSBERGEN ET AL   3,469,395
GAS TURBINE ENGINE DIGITAL FUEL CONTROL
Filed Oct. 22, 1965   5 Sheets-Sheet 5

*INVENTORS*
MERLIN D. SPITSBERGEN
EDWARD K. RANKE
BY *Whittemore,*
*Hulbert & Belknap*
ATTORNEYS United States Patent Office 3,469,395
Patented Sept. 30, 1969

3,469,395
GAS TURBINE ENGINE DIGITAL
FUEL CONTROL
Merlin D. Spitsbergen and Edward K. Ranke, Rochester,
Mich., assignors to Holley Carburetor Company, Warren, Mich., a corporation of Michigan
Filed Oct. 22, 1965, Ser. No. 501,000
Int. Cl. F02c 9/04, 7/26; F15c 1/12
U.S. Cl. 60—39.28                                  14 Claims

ABSTRACT OF THE DISCLOSURE

A digital fuel control for a turbine engine or the like having electronic and pure fluid implementation capability, wherein means are provided for producing digital signals proportional to engine tail pipe temperature, ambient temperature and engine speed and for combining them in an over-temperature surge converter to provide an output digital signal representing the maximum allowed engine speed at the operating speed and temperatures. The output signal from the over-temperature surge converter is then compared with a requested engine speed in a fuel limiter to provide a digital error signal. The digital error signal is used to actuate a fuel valve metering fuel to the engine in accordance with a digital signal provided from a proportional plus integral governor having lead compensation means connected to receive the digital error signal to a fuel valve actuator.

The fuel control includes a start cycle function generator for providing a digital signal to the fuel valve actuator during engine start-up. The digital error signal is then used to actuate a fuel valve for metering fuel to the engine through a proportional plus integral governor having lead compensation means which governor is connected to receive the digital error signal and a fuel valve actuator connected to the governor.

---

In the past fuel controls for turbine engines or the like have usually been hydro-mechanical, Such controls are undesirable in that they require closed machining of three dimensional cams and the like which are expensive to produce. Also, the mating parts of hydro-mechanical fuel control devices are necessarily manufactured with extremely close tolerances making them susceptible to malfunction when used with normally heavily contaminated fuels. Further, the hydro-mechanical fuel controls are particularly cumbersome and therefore unsuited for use with small or medium size engines.

It is therefore an object of the invention to provide a digital fuel control.

Another object is to provide a fuel control which is capable of complete electronic implementation.

Another object of the invention is to provide a fuel control which is capable of pure fluid implementation.

Another object is to provide a digital fuel control including sensor means for sensing a plurality of engine parameters including actual engine speed as digital signals, means for providing a digital signal representative of requested engine speed, computer means for providing an output digital signal representative of the difference between the requested engine speed signal and the actual engine speed signal allowable in accordance with the sensed engine parameters and actuator means for controlling a fuel valve in accordance with the computer output digital signal.

Another object is to provide a fuel control as set forth above wherein the computer means includes an over-temperature surge converter operable to provide a digital signal representative of the maximum speed permissible in accordance with sensed engine parameters.

Another object is to provide a fuel control as set forth above wherein the computer means includes a fuel limiter operable to compare a requested engine speed digital signal with a maximum allowable engine speed digital signal and to provide an output signal representative of the difference between an actual speed signal and the smaller of the two compared signals.

Another object is to provide a fuel control as set forth above wherein the computer means further includes a digital, proportional plus integral governor portion having included lead compensation means.

Another object is to provide a fuel control as set forth above and further including start cycle function means for generating a digital signal operable to actuate the fuel valve actuator during engine start-up in accordance with a predetermined engine start-up fuel schedule.

Another object is to provide structure for producing a digital count directly proportional to the speed of a turbine engine or the like.

Another object is to provide an over-temperature surge converter for a turbine engine operable to provide a digital signal output representative of maximum allowable engine speed relative to sensed ambient temperature and tail pipe temperature of the engine.

Another object is to provide a register with count-up, count-down and random zero reset capabilities.

Another object is to provide structure for producing a digital fluid signal directly proportional to the speed of a turbine engine or the like.

Another object is to provide pure fluid fuel metering structure for a turbine engine or the like.

Another object is to provide a fuel control which is simple in construction, economical to manufacture and efficient in use.

Other objects and features of the invention will become apparent as the description proceeds, especially when taken in conjunction with the accompanying drawings, illustrating a preferred embodiment of the invention, wherein:

With particular reference to the figures of the drawings, one embodiment of the present invention will now be considered in detail.

Figure 1:
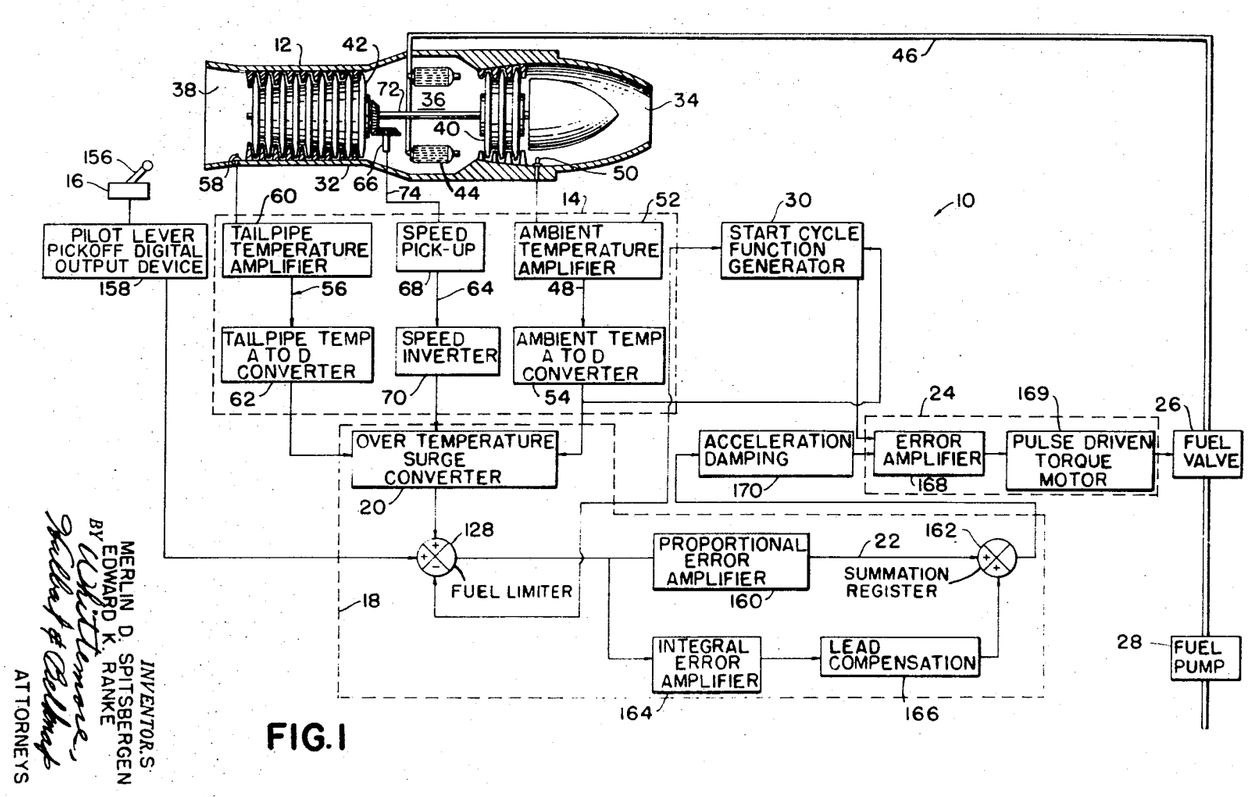
FIGURE 1 is a block diagram of a fuel control constructed in accordance with the invention.

As shown in FIGURE 1 a digital fuel control 10 is connected to meter fuel to the turbine engine 12 through the fuel valve 26 which is supplied with fuel under pressure. The fuel control 10 includes the sensor portion 14 for sensing engine parameters, a speed request portion 16 for requesting desired engine speeds, a computer section 18 including an over-temperature surge converter 20, and a fuel limiter 128 for limiting engine speed to speeds within the physical limits of the engine 12. The computer section 18 of the fuel control 10 also includes a proportional plus integral governor portion 22. An actuator 24 for actuating a fuel valve 26 in accordance with the signal provided from the computer section 18 is also included in the fuel control 10. The start cycle function generator 30 for energizing the actuator to meter fuel through the fuel valve 24 during engine start-up in accordance with a predetermined fuel schedule is also provided.

In operation a digital signal representing actual speed of the engine 12 is compared to the lesser of a desired speed digital signal from the speed request structure 16 and a maximum allowable speed digital signal from the sensor portion 14 of the fuel control 10 to provide an error signal calculated to produce the desired engine speed if permissible in accordance with the physical limitations of the engine. The error signal is fed to the actuator structure 24 through the proportional plus integral governor portion 22 of the computer section 18 to the fuel valve 26 for providing fuel to the engine 12 in accordance with the relation between the permissible speed, desired speed and actual speed. The start cycle function generator 30 provides a digital signal capable of controlling the actuator structure 24 to provide a required engine start-up schedule of fuel for the engine 12.

More specifically the engine 12 is a gas turbine jet engine and includes the housing 32 having intake passage 34 for intake of ambient air, combustion chamber 36 and tail pipe 38. An air compressor 40 is rotatably mounted in the housing 32 and is driven by the turbine 42 through shaft 72 in the usual manner. Fuel is supplied to the burners 44 in the combustion chamber 36 through the fuel line 46 from the fuel valve 26. The engine 12 is conventional and will not be considered in greater detail herein.

Similarly the fuel pump 28 may be a conventional constant pressure pump driven by the engine 12. Since the details of the pump 28 form no part of the present invention they will not be considered herein.

The sensor portion 14 of the fuel control 10 includes a separate structure 48 for providing a digital signal proportional to ambient temperature including the ambient temperature sensor 50, the ambient temperature amplifier 52 and the analog to digital converter 54. The sensing structure 14 further includes the separate structure 56 for providing a digital output signal proportional to tail pipe temperature including the tail pipe temperature sensor 58, the tail pipe temperature amplifier 60 and the analog to digital converter 62. A digital signal proportional to the speed of the engine 12 is provided by the structure 64 including the speed sensing structure 66, speed pick-up structure 68, and the speed inverter 70.

The sensors 50 and 58 may be similar and provide an analog signal proportional to the temperature sensed. The sensors may be thermocouple structures, thermistors, or other known heat sensing structures, such as a temperature sensing pneumatic oscillator as published in "Fluid Amplification Symposium" for May 1964, vol. V. The pneumatic oscillator has the advantages of extreme environment capability, rapid response to temperature changes and practical insensitivity to other operating parameters. The ambient temperature amplifier and tail pipe temperature amplifier structures may be conventional analog signal amplifiers and may for example be solid state electronic amplifier circuits. Similarly the analog to digital converters 54 and 62 may be known types of converters for converting the signals whether they be electronic or pure fluid signals provided by the temperature amplifiers in analog form into digital form to provide digital output signals to the over-temperature surge converter 20 in the computer section 18 of the fuel control 10. The details of these devices will not be considered herein since they may be conventional.

The speed sensing structure 66 as illustrated in FIGURE 1 can be bevel gears, one of which is connected to the compressor drive shaft 72 for rotation therewith and the other of which is connected to an output shaft 74 rotatable in accordance with engine speed. The speed pick-up structure 68 may be any structure for developing a digital signal inversely proportional to speed.

Figure 2:
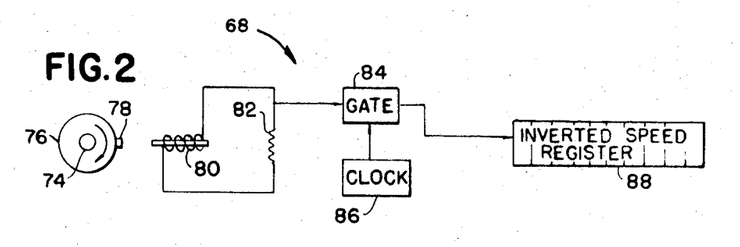
FIGURE 2 is a partially schematic and partially block diagram of speed pick-up structure for the fuel control illustrated in FIGURE 1.

The speed pick-up structure for implementing the fuel control 10, illustrated in FIGURE 2, includes the disc 76 connected to the shaft 74 for rotation therewith having an abutment 78 thereon which intermittently passes adjacent the magnetic pick-up probe 80 to produce a pulsed output across the resistor 82. The time between the pulses across resistance 82 is inversely proportional to the speed of rotation of the shaft 74. The pulsed output across resistor 82 is used to energize the gate structure 84 which may be the usual electronic gate structure to gate clock pulses from the clock structure 86 into the inverted speed register 88.

The clock structure 86 may be a usual electronic clock producing exactly spaced electric pulses passing through gate 84 which cause the register 88 to register a number of pulses directly proportional to the time the gate 84 is open. The time the gate 84 is open is inversely proportional to the speed of rotation of the shaft 74 and therefore the speed of the engine 12. The speed pick-up structure 68 thus produces a count in the inverted speed register 88 which is inversely proportional to the speed of the engine 12.

The inverted speed register 88 has up and down counting and random zero reset capabilities. While such registers exist, since this type of register is used throughout the fuel control 10, a simple logic diagram of one such register 88 is provided in FIGURE 3.

Figure 3:
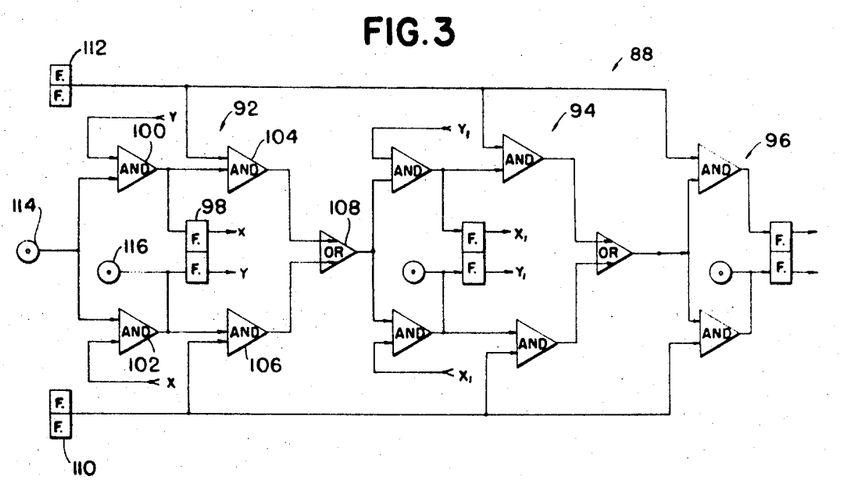
FIGURE 3 is a logic diagram of an up-down counting register having zero reset capabilities for use in the fuel control illustrated in FIGURE 1.

With particular reference to the structure of FIGURE 3, the register 88 includes a plurality of separate stages, only three of which 92, 94 and 96 are shown. Each of the stages 92, 94 and 96 are provided with a flip-flop output indicator circuit 98 for providing either a zero or 1 logic level output from a selected side, for example the upper side thereof, as shown in FIGURE 3, whereby a discrete digital count may be stored in the register 88 in accordance with the binary number system. Each of the separate stages 92, 94 and 96 are further provided with first up and down count AND gates 100 and 102 respectively, second up and down count AND gates 104 and 106 respectively, and an OR gate 108 connected, as shown in FIGURE 3. The second AND gates and OR gate for stage 96 are not shown. Each of the stages is further connected to both the the count-up flip-flop 110 and is passed to the AND gate as shown.

The input digital signal which it is desired to count or register is placed in the register through the input connection 114 and is fed to both the up count and down count first AND gates 100 and 102 of the first stage 92 of the register 88, while the output signals of the indicator flip-flops 98 are similarly fed to the AND gates 100 and 102, as indicated by the letter matched connectors connected thereto. Zero reset input signal connections 116 to the flip-flops 98 are provided for each separate stage of the register 88.

In operation of the register 88, assuming that the register has been reset to indicate zero in the binary code on the flip-flop indicators 98, that is a 1 logic level output from the lower side of each of the flip-flops 98 is present due, for example, to a zero reset input signal on the reset input connections 116, a count-up signal is received by the count-up flip-flop 110 and is passed to the AND gate 106. At this time a zero logic level signal is provided at the AND gate 102 from the indicator flip-flop 98 in the first stage 92 of the register 90, a 1 logic level is provided the AND gate 100 by the indicator flip-flop 98, and a zero logic level is provided the AND gate 104 from the count down flip-flop 112. On the first count signal from the input connection 114 a signal will thus be gated through the AND gate 100 but not through the AND gate 102 to provide a 1 logic level output from the top portion of the flip-flop 98. No output is provided from the AND gate 106 at this time since no 1 logic level signal is present from AND gate 102. Similarly no output is provided from the AND gate 104 at this time due to a zero logic level output from the down count flip-flops 112 with no signal applied thereto.

When the next pulse which is to be counted up is received on the input connection 114 the signal is allowed to pass through the lower AND gate 102 due to the now reversed output logic levels of the indicator flip-flop 98 to reverse the flip-flop 98 to again register a zero indicator logic level from the top portion thereof and the AND gate 106 is energized to permit a signal to pass to the OR gate 108. The logic level on the indicator flip-flop 98 in the stage 94 of the register 88 is thus changed in the manner in which the first count signal changed the first stage 92 of the register considered above. Thus at the second count signal with the up flip-flop 110 energized, the first two stages of the counter will have respectively a zero and a 1 output logic level from the upper portions thereof to indicate a 2 count in the binary number system. There will be no output on the second count signal from the AND gate 100 since a zero logic level is fed thereto as a result of the previous 1 count registered on flip-flop 98.

Assume, for example, then that it is desired to count the register 88 down on the next pulse presented at the input connection 114. The count up flip-flop 110 is reversed to provide a zero logic output to AND gate 106 and the count down flip-flop 112 is energized to provide a 1 logic level signal to the AND gate 106 in the stages 92, 94 and 96. The next pulse on the input connection 114 will then provide an output from the AND gate 100 due to the logic 1 output from the bottom portion of the indicating flip-flop 98 to the AND gate 100 so that the indicating flip-flop 98 is again reversed in logic level. At the same time the AND gate 104 is caused to provide an output which is passed through the OR gate 108 to the AND gate 102 in the second stage 94 of the counter 88. An output is thus provided from the AND gate 102 in the second stage 94 of the counter 88 due to the 1 logic level from the indicator flip-flop 98 therein to AND gate 102. The output of the AND gate 102 in the second stage 94 thus reverses the output level of the flip-flop indicator 98 in the second stage to provide a zero indicator output in the top portion thereof. Thus the logic level of the first two stages of the register 88 is 1 and zero respectively, which is 1 in the binary number system, so that a down count has been accomplished.

Zero reset can be accomplished from any numerical count on the register 88 by merely providing an input on the zero reset input connections 116 to the indicator flip-flops 98 to return them to a zero input logic level from the top portion thereof. The number of stages of the register 88 is of course determined only by the maximum count desired. Thus, a 10 stage register in accordance with the binary system can provide discrete conditions for registering one thousand twenty-four separate counts.

Figure 4:
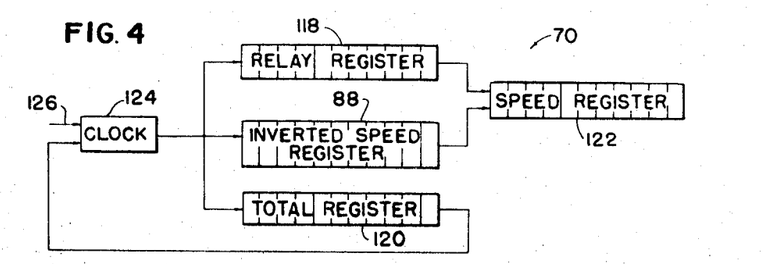
FIGURE 4 is a block diagram of a digital speed signal inverter for use in the fuel control illustrated in FIGURE 1.

The speed inverter structure 70 of FIGURE 4 makes use of three up-down random registers 118, 120 and 122 in addition to the inverted speed register 88, illustrated in FIGURE 2, along with a single clock pulse producing structure 124, all connected as shown in FIGURE 2.

In operation the total register 120 is first preset to a high count which is sufficient to establish a count in the speed register 122, having only acceptable error possibilities due to operating characteristics of the inverter structure 70, which count is proportional to the speed of the engine 12. After the inverted speed register has been provided with a digital count inversely proportional to the speed of the engine 12, as previously indicated in a cycle of operation of the fuel control 10, a signal is provided to the clock 124 over the input connection 126 from a central timing system to produce clock pulses from the clock 124 whereby the inverted speed register 88 is counted down and the relay register 118 is counted up along with the total register 120.

When the inverted speed register reaches a zero count a signal is provided to the speed register as a single count and the direction of counting of the inverted speed register and relay register is reversed. The relay register is then counted down and the inverted speed register is counted up until the relay register registers zero. The total register 120 is continually counted down.

When the relay register counts zero a count is again placed in the speed register and the direction of counting of the inverted speed register and relay register is again reversed. This sequence is repeated until the total register registers a zero count at which time a signal is sent from the total register 120 to the clock 124 to cut off the clock signal and stop the counting procedure.

The number registered in the speed register will then be directly proportional to the speed of the engine since it is a measure of the number of times the signal originally in the inverted speed register is contained in the large number originally set in the total register. The total register is also reset at a zero indication thereon to the original large number thereon ready for another cycle or sequence of operation of the fuel control 10.

Thus the output from the analog to digital converters 54 and 62 and the speed inverter 70 are digital signals the number of pulses in which are representative of ambient temperature, engine tail pipe temperature and engine speed, respectively. The digital signals are sampled in each cycle of operation in accordance with a timing sequence for the fuel control 10 which provides for the required control of the fuel valve 26. The signals from the sensing structure 14 during each cycle of the fuel control 10 are used in the over-temperature surge converter 20 of the fuel control computer section 18, best shown in FIGURE 5, to provide an output digital signal to the fuel limiter 128 of the computer section.

Figure 5:
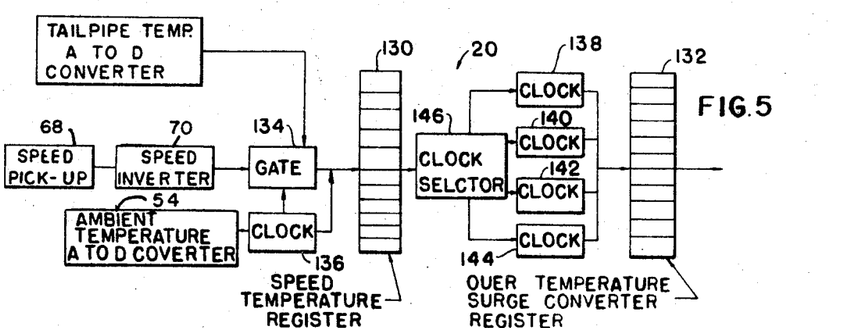
FIGURE 5 is a block diagram of an over-temperature surge converter for use in the fuel control illustrated in FIGURE 1.

As shown in FIGURE 5, the over-temperature surge converter 20 includes a speed temperature register 130, an over-temperature surge converter register 132, gate structure 134 for gating signals from the speed pick-up 68 to the speed temperature register 130, clock structure 136 for providing a clock signal having a frequency variable in accordance with the ambient temperature signal from converter 62 through the gate 134 to the speed temperature register 130 between successive pulses from the speed sense structure 66 as developed in the speed pick-up 68. The over-temperature surge converter 20 further includes a plurality of schedule clock pulse producing structures 138, 140, 142 and 144, which may be a single synchronous clock pulse producing structure, controlled by clock selector structure 146 in accordance with a preselected schedule during counting of the speed temperature register 130.

The function of the over-temperature surge converter 20 is to provide a digital output signal to the fuel limiter 128 which is representative of allowed engine speed with the sensed ambient input temperature and tail pipe temperature. It is assumed that a graph of curves of allowed tail pipe temperature at all engine speeds at different ambient temperatures, as illustrated in FIGURE 6, is provided by for example the engine manufacturer.

The curves are approximated by straight lines, such as lines 148, 150, 152 and 154, the slope of which is proportional to the rate of the clocks 138, 140, 142 and 144. It is desired to follow the lowest, minus 65° F., ambient temperature curve to provide a signal representative of the maximum allowable speed signal at the lowest ambient temperature which is the speed at which the tail pipe temperature becomes critical at the low ambient temperature. A correction is then added to the determined speed signal to correct the speed signal for the actual ambient temperature.

Figure 6:
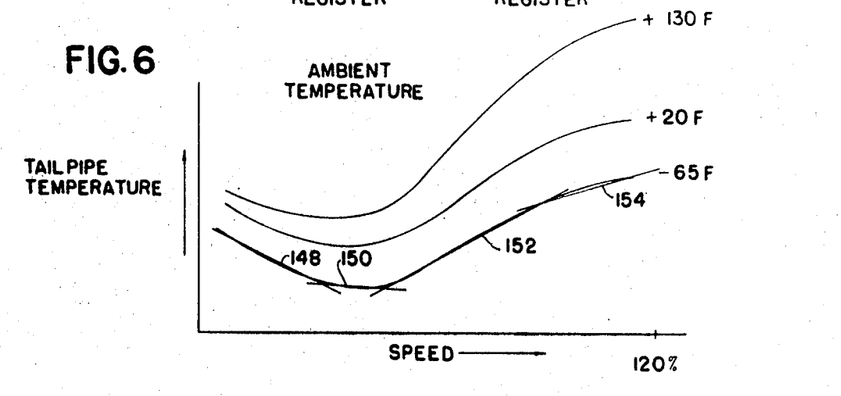
FIGURE 6 is a graph useful in explaining the operation of the over-temperature surge converter illustrated in FIGURE 5.

In other words, in accordance with the graph of FIGURE 6 means are provided within the over-temperature surge converter to first follow the lowest curve for the minus 65° F. ambient temperature curve to establish a maximum allowable digital speed signal at the actual speed permissible due to tail pipe temperature considerations and then move upward on the graph to add a digital count correction permitted since the ambient temperature is above the indicated lowest curve.

To accomplish the above indicated function a signal is first placed in the speed temperature register which is gated in accordance with the time between successive pulses sensed by the speed pick-up 68 at a clock rate determined by the sensed ambient temperature. The signal in the speed-temperature register 130 will thus be inversely proportional to speed. The speed-temperature register 130 is then caused to count to zero and the clock selector 146 is caused to initiate clock pulses from the schedule clocks 138, 140, 142 and 144 in accordance with the predetermined schedule, as indicated in the graph of FIGURE 6 by the straight lines 148, 150, 152 and 154 to count the over-temperature surge converter register down from an initial count representative of one hundred twenty percent of allowable engine speed at the low minus 65° F. ambient temperature until the speed temperature register 130 reaches a zero count. The over-temperature surge converter register 132 will thus be provided with a count representative of the maximum speed permissible at the ambient temperature minus 65° F. due to tail pipe temperature limitations. The speed temperature register will be at a zero count.

The speed-temperature register is then counted up with the ambient temperature controlled clock for a precision period of time and will reflect a count proportional to ambient temperature. The speed-temperature register 130 is then caused to start counting down and the clock selector 146 is caused to start a clock schedule from the schedule clocks which follows the variation in permissible speed count for a particular tail pipe temperature in accordance with varied ambient temperature. This count is added to the maximum speed count at the low minus 65° F. temperature in the over-temperature surge converter register to produce the final output count of the over-temperature surge converter in each cycle of operation of the fuel control 10.

The speed request structure 16 includes a pilot pick-off lever 156 operable to change the frequency of a digital output device 158 in accordance with the position thereof to produce a digital signal proportional to desired speed which is of the same magnitude as the digital signal provided by the speed inverter 70 for the same engine speed. The structure 158 may be an oscillator having a variable frequency pulsed output which structures are known and will not therefore be considered in detail herein.

The signals from the speed request structure 16 and from the over-temperature surge converter 20 are compared in the fuel limiter 128 and the difference between the lesser of the two signals and the actual speed signal count from the speed inverter 70 is found to provide an error signal to the proportional plus integral governor portion 22 of the computer section 18 of fuel control 10.

Proportional plus integral digital governor structures are known and therefore will not be considered in detail herein. Briefly however, the error signal is passed through a proportional error amplifier 160 to a summation register 162 where the digital signal therefrom is added to a digital signal produced by adding the error signal to the sum of previous error signals in the integral error amplifier 164 after it has been passed through lead compensating structure 166. The digital output signal is then passed through the error amplifier 168 to the torque motor 169 of actuating structure 24. Acceleration damping structure 170 may be provided between the summation register 162 of the computer section 18 and the error amplifier 168 of the actuating structure 24 if desired.

Torque motors are well known and will therefore not be considered in detail except to point out that on the feeding of a digital signal from the amplifier 168 to the torque motor 24 it is actuated to provide a predetermined torque in a predetermined direction for the time that the signal is being counted from a register to which it is fed during each cycle of operation of the fuel control 10. Thus in the actuator structure 24 for each cycle of the fuel control 10 the torque motor will be actuated for a variable length of time depending on the count fed thereto from the error amplifier 168. The fuel valve 26 is thus driven by a pulse of variable width from the torque motor to schedule more or less fuel through the fuel valve 26 in accordance with the fuel requirements determined by the fuel control 10.

Figure 9:
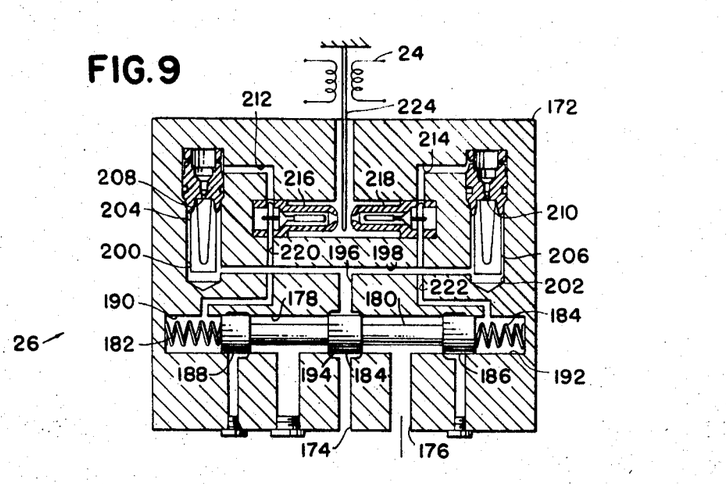
FIGURE 9 is a partially diagrammatic, partially schematic diagram of a torque motor controlled fuel valve for use with the fuel control illustrated in FIGURE 1.

One possible fuel valve 26 is illustrated in FIGURE 9. The fuel valve 26 includes a housing 172 having a fuel inlet passage 174 from the fuel pump 28 and a fuel outlet passage 176 through which fuel is fed to the fuel line 46. The valve housing 172 further includes a cylindrical chamber 178 therein in which the spool valve 180 is positioned centrally by the spring means 182 and 184 in the opposite ends of the passage 178. The spool valve 180 has the enlarged cylindrical portion 184 for preventing passage of fuel from the inlet passage 174 to the outlet passage 176 with the valve held in the central position by the springs 182 and 184. The enlarged portions 186 and 188 at the ends thereof form pressure chambers 190 and 192 at the ends of the spool valve 180 in conjunction with the ends of the cylindrical chamber 178. Fuel is passed to the pressure chambers 190 and 192 from the inlet passage 174 around the cylindrical portion 184 of the spool valve 180 through passage 194, passage 196, passage 198, chambers 200 and 202, filters 204 and 206, orifices 208 and 210, passages 212 and 214 by bleed valves 216 and 218 and through passages 220 and 222, respectively.

In operation of the fuel valve 26 the torque motor 169 is energized so that the fuel valve reed or flapper 224 moves toward the bleed valve 218 during reception of the digital signal by the torque motor from the error amplifier in each cycle of operation of the fuel control 10. Movement of the reed 224 toward the bleed valve 218 permits more of the fluid passing through the passage 212 to bleed through the bleed valve 216 to a low pressure return, thus reducing the pressure in the pressure chamber 190. Simultaneously the movement of the reed 224 toward the bleed valve 218 will prevent as much fuel from the passage 214 from bleeding into the low return as previously, whereby the pressure in the pressure chamber 192 will be increased. The spool valve 180 will thus be moved to the left in FIGURE 9 to connect the fuel supply passage 174 to the fuel outlet passage 176. As previously indicated the fuel will thus be allowed to pass to the fuel line 46 for as long as the flapper 224 is moved to the right by energization of the torque motor 24.

The operation of the fuel valve 26 is thus pulsed in accordance with the sampling of the engine parameters in each cycle of operation of the fuel control 10. The fuel line 46 will provide integration of the pulsed fuel signals through the valve 26 before they arrive at the engine 12, although an accumulator (not shown) may be supplied to aid in the integrating of the pulsed fuel signals to assure a constant flow of fuel at the engine if desired.

Figures 7, 8:
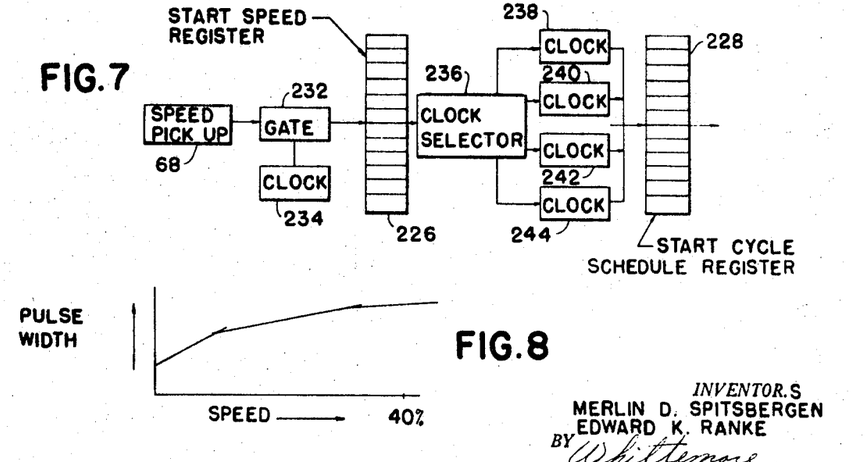
FIGURE 7 is a block diagram of a start cycle function generator for use in the fuel control illustrated in FIGURE 1.
FIGURE 8 is a graph useful in explaining the operation of the start cycle function generator illustrated in FIGURE 7.

The fuel control 10 further includes a start cycle function generator 30, as previously indicated, the function of which is to provide a digital signal to the error amplifier of the actuator structure 24 representative of the pulse width of the signal output from the torque motor desired during engine start-up in accordance with a known schedule of pulse width and engine speed, as shown in FIGURE 8. The start cycle function generator 30 may be implementated in a manner similar to the implementation of the over-temperature surge converter 20, as shown best in FIGURE 7.

It will first be assumed that a schedule of fuel flow in accordance with pulse width as defined by the open time of fuel valve 26 is known, which fuel flow is desired during engine start-up up to some engine speed below forty percent of the maximum engine speed. To provide a digital signal to the error amplifier 168 representative of the schedule illustrated in FIGURE 8, a start speed register 226, a start cycle schedule register 228, speed pick-up 68, a gate 232, means for producing clock pulses at a predetermined rate 234, clock selector structure 236 and a plurality of schedule clocks 238, 240, 242 and 244 are required connected substantially as shown in FIGURE 7.

The speed sense 68, as shown in FIGURE 2, is operable to gate the clock signals from the clock 234 through the gate 232 which will provide a count in the start speed register 226 inversely proportional to the speed of the engine. As the start speed register 236 is counted down the schedule register 228 is also counted down from a count representative of the desired pulse width of the actuated torque motor 24 at forty percent engine speed which is initially set in the schedule register toward zero at various selected clock rates selected from the schedule clocks 238, 240, 242 and 244 by the clock selector structure 236 in accordance with the schedule indicated in FIGURE 8. When the start speed reversing register 226 registers a zero count, the count in the schedule register 228 which will be passed to the error amplifier 168 is proportional to the desired pulse width or actuated time of torque motor 169.

Thus in overall operation of the fuel control 10, the fuel control is repeatedly cycled to sample the ambient temperature, the engine speed and tail pipe temperature along with the requested engine speed. Depending on whether or not the engine is up to speed the start cycle function generator 30 just described will provide a digital signal to the error amplifier representative of the pulse width of the torque motor required for the desired fuel flow to the engine 12 or the digital signal will be provided from the computer section 18 of the fuel control 10 providing the engine is not controlled by the start cycle function generator.

Under control of the computer section 18 digital signals proportional to ambient temperature, engine speed and tail pipe temperature are fed into the over-temperature surge converter 20 to provide a digital signal output which is proportional to the maximum allowed engine speed as controlled by fuel fed thereto and thus the pulse width of the torque motor which will not allow overheating of the engine tail pipe. The maximum allowable digital signal is then compared with the requested pulse width as represented by the digital signal from the speed request structure 16 in the fuel limiter 128. Subsequently the smaller of the two signals from the over-temperature surge converter 20 and requested speed structure 16 is compared with the actual speed signal from the speed inverter 70 to provide a digital error signal which is passed through the proportional plus integral governor portion 22 of the fuel control 10 through the acceleration damping structure 170 to actuator structure 24 to provide a digital signal at the torque motor 169 which is operable to supply as much requested fuel to the engine as permitted by the engine operating parameters through the fuel valve 26.

The sequencing of the fuel control 10 is limited only by the practical operational consideration of the components, such as speed of operation of the registers and the like. Cycling of the fuel control 10 and therefore sampling of sensed engine parameters and pulse width changes of the torque motor several times a second are contemplated.

While the implementation of the fuel control 10 illustrated in FIGURE 1, wherein it is not common knowledge, has been indicated to be electronic, it will be understood that pure fluid implementation is possible where size and speed of operation is not a controlling factor. In particular it would be possible to provide pure fluid sensing apparatus and pure fluid pulse length modulated turbine fuel supply actuator.

Figure 10:
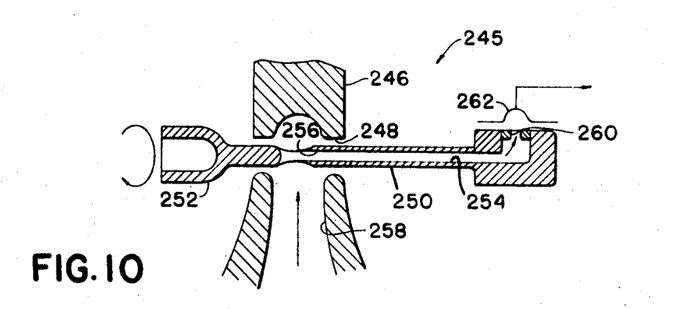
FIGURES 10, 11 and 12 are modifications of fluid speed pick-up devices operable to provide digital fluid signals proportional to engine speed for use in a fuel control similar to that illustrated in FIGURE 1.
Figure 11:
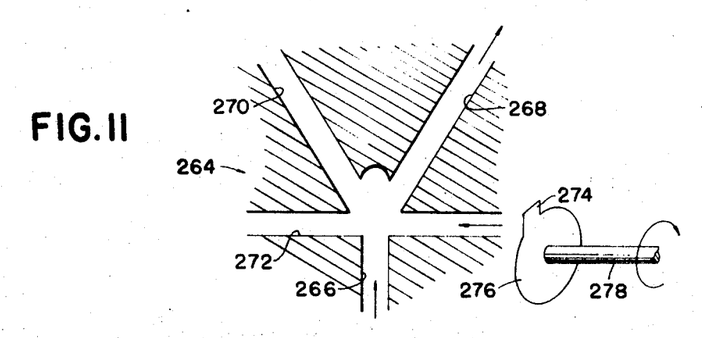
Figure 12:
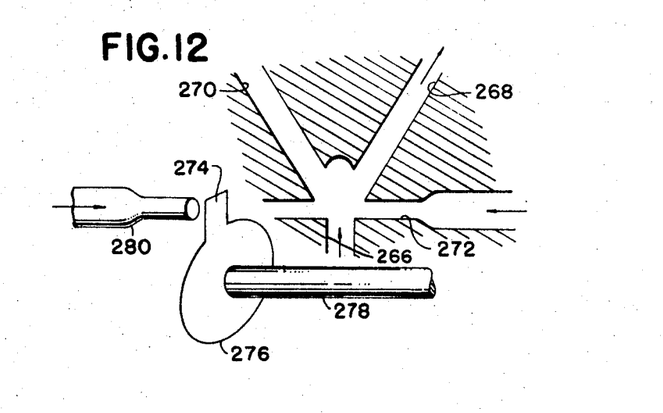
Figure 13:
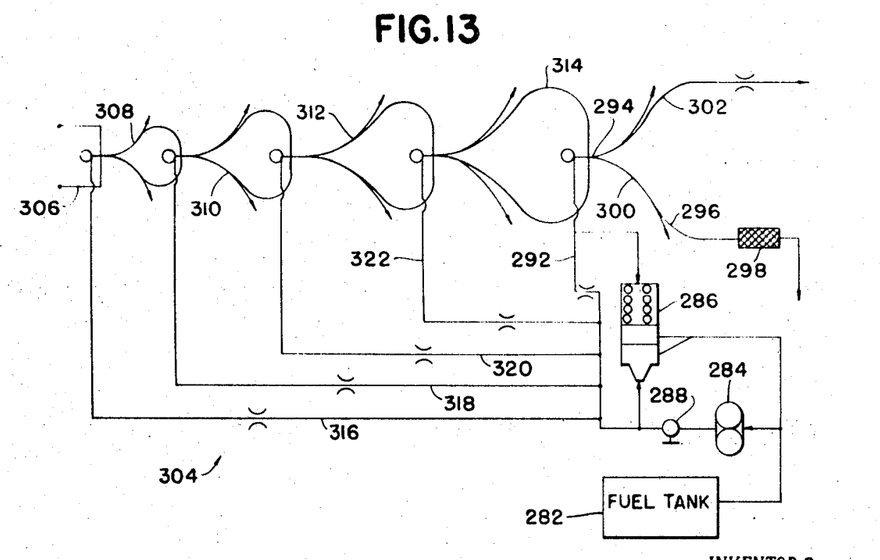
FIGURE 13 is a schematic diagram of pure fluid fuel metering structure for use in a digital fuel control similar to that illustrated in FIGURE 1.

Three pure fluid devices for providing digital pulses in accordance with the speed of the engine 12 are illustrated in FIGURES 10, 11 and 12. A pure fluid pulse length modulated turbine fuel supply actuator is illustrated in FIGURE 13.

The structure 245 for providing a digital signal proportional to engine speed illustrated in FIGURE 10 includes a housing 246 having an opening 248 extending therethrough through which the member 250 extends. The member 250 is connected at end 252 for rotation in accordance with engine speed and is provided with an opening 254 extending axially thereof and in communication at end 256 with the high pressure passage 258 in the housing 246 around the entire circumference of the member 250 within the housing. A restricted opening is provided in the end 260 of the passage 254 extending radially of the member 250.

Thus in operation, as the member 250 is rotated the high pressure from passage 258 will proceed along passage 254 and will provide a high pressure pulse at the pick-up opening or diaphragm 262 for each revolution of the member 250. The number of pulses in a given time will thus be proportional to the speed of rotation of the member 250. More or less pulses per revolution of the member 250 may of course be provided in accordance with the number of openings in the end 260 of the passage 254 or the number of pick-up openings or diaphragms 262 positioned radially of the member 250.

In the fluid structure of FIGURE 11 a pure fluid coanda effect amplifier 264 is provided including a high pressure fluid input passage 266 branching into an output passage 268 and a low return passage 270, and a bias passage 272 extending across the high pressure input passage 266. In accordance with the usual operation of such amplifiers, flow in the passage 266 will be directed toward the passage 270 due to the configuration of the passages and the coanda effect as long as a bias pressure is provided in the passage 272 in the direction indicated. When the bias pressure in the passage 272 is restricted by for example the entrainment limiting tab 274 on the disc 276 rotating at engine speed on the shaft 278, the output is changed from the passage 270 to the output passage 268.

Thus in operation, since the disc 274 passes the bias passage 272 once in every revolution of the shaft 278 which revolves at engine speed or a speed proportional to engine speed, a digital fluid output proportional to the speed of the engine 12 is provided in the passage 268.

The structure of FIGURE 12 is similar to that of FIGURE 11, except for the fact that the bias pressure is applied from the opposite direction in the bias passage 272 to insure the high pressure fluid normally going into the low pressure return passage 270 and a high bias conduit 280 for passing high pressure bias fluid into the passage 272 and directing the high pressure fluid from passage 266 into the output passage 268 is provided. The tap 274 is then connected to the disc 276 and is positioned to restrict the flow of the high pressure bias into the bias passage 272 on rotation of the shaft 278.

The pure fluid fuel metering structure illustrated in FIGURE 13 is shown in conjunction with a fuel tank 282, a fuel pump 284 and accumulator structure 286 operable to provide a substantially constant fuel pressure from the pump 284 past manual shut-off valve 288. The metered fuel flow is from the pump 284 through fuel conduit 292 into the input passage 294 of a coanda effect fluid amplifier 300 having an output passage 296 through which fuel is passed to an engine 12 through fuel filter 298. With bias unapplied to the fluid amplifier 300, the fuel will pass through the restricted low return passage 302 back to the fuel tank 282.

Thus again a pulsed fuel output is provided from the fuel metering structure 304, the pulse width of which may be determined by the width of a pulsed pneumatic signal in the bias passage 306 for the fluid amplifier 308. The pulse width and pulse repetition frequency of the bias signal in passage 306 may be determined by the computer section or the start cycle function generator of a fuel control similar to fuel control 10. The pneumatic signal from the bias passage 306 is amplified through the amplifiers, 308, 310, 312 and 314 where it is used to provide the bias signal for the amplifier 300. Each of the amplifiers 308, 310, 312 and 314 are shown to be supplied with fluid from the fuel pump 284 through the restricted passages 316, 318, 320 and 322 respectively. If desired, all except the last amplifier 300 of course may be pneumatic or use fluid from a different source. The fluid amplifiers 308, 310, 314 and 300 are vented by vent passages as shown in FIGURE 13.

The word "digital" is used herein in its broad sense, that is to define discrete signals in contrast to analog signals. Thus the word "digital" is an adjective.

While one embodiment and several modifications of the present invention have been disclosed in detail, it will be understood that other embodiments and modifications are contemplated. It is the intention to include all embodiments and modifications as are defined by the appended claims within the scope of the invention.

What we claim as our invention is:

1. A turbine engine, a source of fuel under pressure, fuel line means extending between said source of fuel and engine, a fuel valve in the fuel line for controlling the quantity of fuel passed to the engine, and a digital fuel control positioned between and operably associated with said engine and fuel valve for controlling the fuel valve in accordance with sensed and desired engine parameters, including sensor means for providing separate digital signals proportional to the engine parameters with which it is desired to control the fuel flow to the engine, including means for providing digital signals representative of ambient engine input temperature, engine tail pipe temperature at a predetermined low ambient temperature, means signal representative of a desired engine parameter, computer means connected to receive the digital signals and to provide a digital output error signal in accordance with limit engine conditions and the difference between the requested engine parameter and a sensed engine parameter, including an over-temperature surge converter for providing a digital output signal representative of the maximum allowable speed signal corrected for allowable tail pipe temperature at the sensed ambient temperature, including a speed temperature register, an over-temperature surge converter register, means for producing an initial clock signal having a modulated frequency representative of ambient temperature, a gate for gating the initial clock signal into the speed temperature register between successive digital pulses inversely proportional to speed, a plurality of schedule clocks for producing clock pulses having different frequencies, means for counting the speed-temperature register back to a zero count and simultaneously gating different ones of the schedule clocks into the over-temperature, surge converter register to provide a speed count therein representative of maximum allowable speed as limited by tail pipe temperature at a predtermined low ambient temperature, means for providing a signal in the speed temperature register proportional to tail pipe temperature, means for counting the speed-temperature register back to zero and means for gating separate ones of the schedule clocks into the over-temperature, surge converter register to add to the speed signal therein to provide an allowable tail pipe temperature speed signal corrected for sensed ambient temperature and actuating means positioned between the computer means and fuel valve for actuating the fuel valve in accordance with the digital output error signal from the computer means.

2. Structure as set forth in claim 1 and further including a start cycle function generator connected to receive predetermined ones of the sensed engine parameters and to provide a digital output signal to the actuating means for bringing the engine up to speed in a predetermined schedule during start thereof.

3. Structure as set forth in claim 2 wherein the start cycle function generator includes a start speed register and a start cycle schedule register initially set at a predetermined count representative of a desired fuel flow at a predetermined speed, means for producing an initial clock pulse and for gating the initial clock pulse into the start speed register in accordance with the speed of the engine, means for producing schedule clock pulses at separate clock rates, means for counting the start speed register to a zero count after it has been counted to a predetermined count by initial clock pulses provided in accordance with engine speed and for simultaneously gating selected schedule clock pulses into the schedule register while the start speed register is returning to a zero count to count the schedule register down from the initial count thereon whereby the count remaining in the schedule register when the start speed register returns to a zero count is representative of the desired starting schedule for the engine at the speed sensed during engine start up.

4. Structure as set forth in claim 1 wherein said engine speed sensor provides a digital signal inversely proportional to engine speed, and a speed inverter to convert said last-mentioned signal to a signal directly proportional to engine speed, the speed inverter comprising a relay register and an inverted speed register in parallel, a speed register connected to the parallel registers for receiving one counting pulse each time the inverted speed register and relay register reach a zero count, a total register having an initial count thereon which is substantial multiple of the total inverted speed count from the inverted speed register, a source of clock pulses connected to the parallel registers and total register for supplying counting pulses thereto, means for counting the inverted speed register to a zero count from a speed count registered thereon alternately with the relay register while counting the other parallel register up and providing a single count in the speed register each time the inverted speed register and relay register reach a zero count and means for counting the total register down continuously during counting of either of the parallel registers, means for sensing a zero count in the total register and for cutting off the clock pulses to all of the registers on sensing a zero count in the total register whereby the speed register will provide a digital signal proportional to engine speed.

5. Structure for us in conjunction with a turbine engine or the like comprising means for providing digital signals representative of ambient engine input temperature, engine tail pipe temperature and engine speed and an over-temperature surge converter for providing a digital output signal representative of the maximum allowable speed signal corrected for allowable tail pipe temperature at the sensed ambient temperature comprising, a speed-temperature register, an over-temperature, surge converter register, means for producing an initial clock signal having a modulated frequency representative of ambient temperature, a gate for gating the initial clock signal into the speed temperature register between successive digital pulses inversely proportional to speed, a plurality of schedule clocks for producing synchronous clock pulses having different frequencies, means for counting the speed-temperature register back to a zero count and simultaneously gating different ones of the schedule clocks into the over-temperature, surge converter register to provide a speed count therein representative of maximum allowable speed as limited by tail pipe temperature at a predetermined low ambient temperature, means for providing a signal in the speed-temperature register proportional to tail pipe temperature, means for counting the speed temperature register back to zero and means for gating separate ones of the schedule clocks into the over-temperature, surge converter register to add to the speed signal therein to provide an allowable tail pipe temperature speed signal corrected for sensed ambient temperature sensed.

6. A fuel control for a turbine engine including a tail pipe comprising, means operably associated with the engine for sensing the engine parameters of ambient temperature, tail pipe temperature and engine speed and providing parameter output signals proportional thereto, an over-temperature surge converter for receiving the parameter output signals and providing an output signal representative of maximum engine speed permissible at the sensed engine parameters, means for providing a signal representative of a requested engine speed, a fuel limiter connected to receive the output signal from the over-temperature surge converter and the requested speed signal and for providing an error signal output proportional to the difference between permissible engine speed and requested engine speed, a proportional plus integral governor connected to receive the signal from the fuel limiter, a fuel valve actuator connected to receive the output signal of the proportional plus integral governor, and a fuel valve for metering fuel to the turbine engine connected to the fuel valve actuator for metering fuel to the engine in accordance with the error signal from the fuel limiter passed to the valve actuator through the governor.

7. Structure as set forth in claim 6, wherein the parameter output signals are digital signals.

8. Structure as set forth in claim 6, wherein the signals representative of a requested engine speed and the signal from the over-temperature surge converter connected to the fuel limiter are digital signals and the output from the fuel limiter to the proportional plus integral governor is also a digital signal.

9. Structure as set forth in claim 6, and further including a start cycle function generator connected to receive the ambient temperature signal and to provide a digital output signal to the fuel valve actuator in accordance with a start cycle engine fuel flow function.

10. Structure as set forth in claim 1 and further including a start cycle function generator connected to receive predetermined ones of the sensed engine parameters and to provide a digital output signal to the actuating means for bringing the engine up to speed in a predetermined schedule during start thereof.

11. Structure as set forth in claim 10 wherein the start cycle function generator includes a start speed register and a start cycle schedule register initially set at a predetermined count representative of a desired fuel flow at a predetermined speed, means for producing an initial clock pulse and for gating the initial clock pulse into the start speed register in accordance with the speed of the engine, means for producing schedule clock pulses at separate clock rates, means for counting the start speed register to a zero count after it has been counted to a predetermined count by initial clock pulses provided in accordance with engine speed and for simultaneously gating selected schedule clock pulses into the schedule register while the start speed register is returning to a zero count to count the schedule register down from the initial count thereon whereby the count remaining in the schedule register when the start speed register returns to a zero count is representative of the desired starting schedule for the engine at the speed sensed during engine start up.

12. Structure as set forth in claim 1, wherein the means for providing a digital signal representative of engine speed includes means for first providing a digital signal inversely proportional to the speed of the engine.

13. Structure as set forth in claim 12, wherein the means for providing a digital signal representative of engine speed further includes speed inverter structure for inverting the digital speed signal inversely proportional to the speed of the engine to provide a digital signal which is directly proportional to engine speed.

14. Structure as set forth in claim 13, wherein the speed inverter comprises a relay register and an inverted speed register in parallel, a speed register connected to the parallel registers for receiving one counting pulse each time the inverted speed register and relay register reach a zero count, a total register having an initial count thereon which is a substantial multiple of the total inverted speed count from the inverted speed register, a source of clock pulses connected to the parallel registers and total register for supplying counting pulses thereto, means for counting the inverted speed register to a zero count from a speed count registered thereon alternately with the relay register while counting the other parallel register up and providing a single count in the speed register each time the inverted speed register and relay register reach a zero count and means for counting the total register down continuously during counting of either of the parallel registers, means for sensing a zero count in the total register and for cutting off the clock pulses to all of the registers on sensing a zero count in the total register whereby the speed register will provide a digital proportional to engine speed.

References Cited

UNITED STATES PATENTS

| | | |
|---|---|---|
| 3,171,966 | 3/1965 | Bergslien et al. |
| 3,301,269 | 1/1967 | Marwood _______ 60—39.28 XR |
| 3,302,398 | 2/1967 | Taplin et al. _______ 60—39.28 |

CARLTON R. CROYLE, Primary Examiner

DOUGLAS HART, Assistant Examiner

U.S. Cl. X.R.

60—39.14; 137—81.5